May 28, 1968
R. J. VEZINA
3,385,610
TRAILER ADJUSTABLE EXTENSION BOOM
Filed Nov. 14, 1966
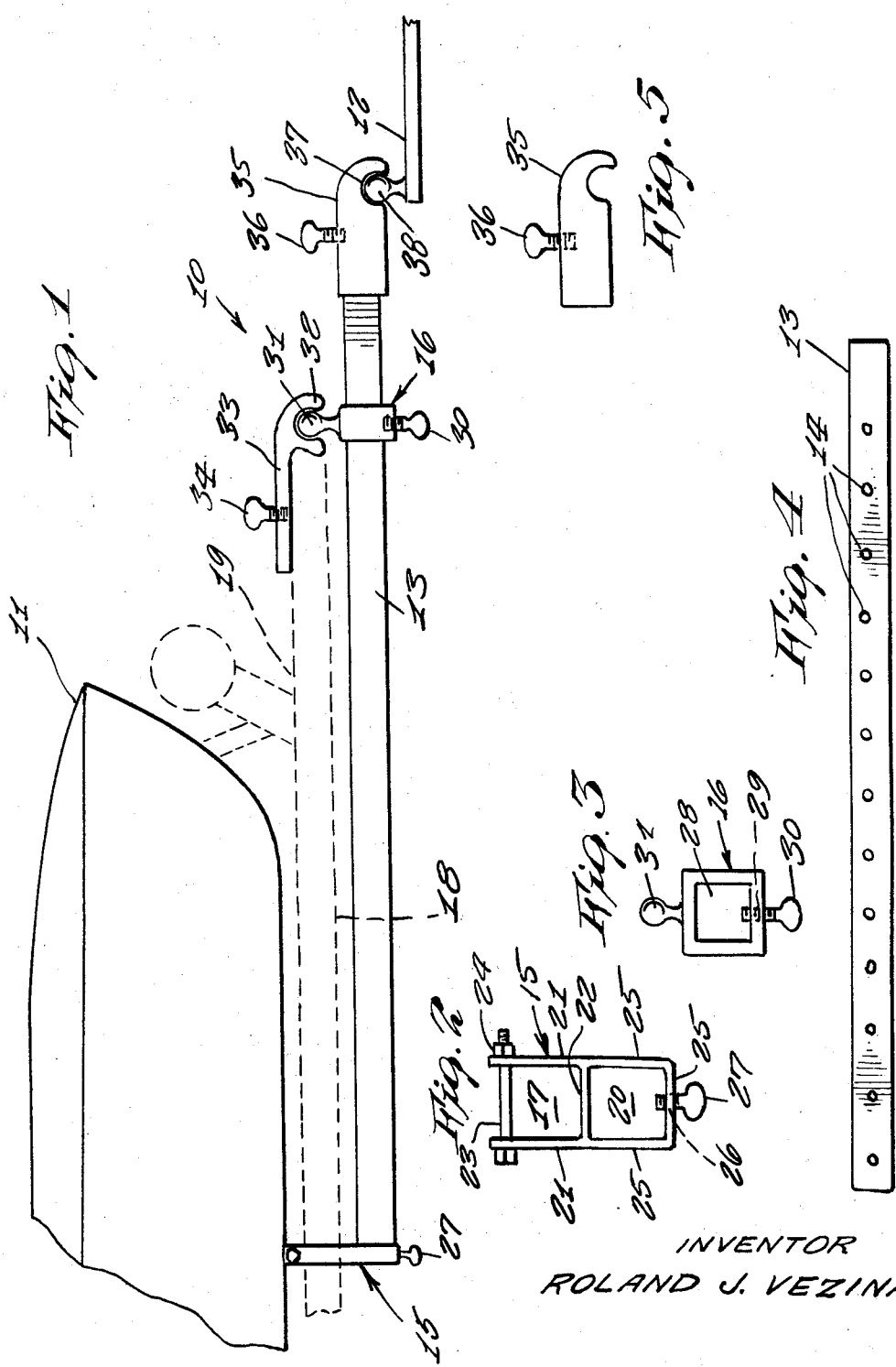
INVENTOR
ROLAND J. VEZINA United States Patent Office 3,385,610
Patented May 28, 1968

3,385,610
TRAILER ADJUSTABLE EXTENSION BOOM
Roland J. Vezina, 118 Pollard Road,
Lincoln, N.H. 03251
Filed Nov. 14, 1966, Ser. No. 593,905
4 Claims. (Cl. 280—482)

ABSTRACT OF THE DISCLOSURE

A boom for a boat trailer which is longitudinally extendable so to reach a boat in the water while an automobile which carries the boom, can remain far enough from the water's edge so to stay upon solid ground, the boom including a member being secured at one end to an automobile hitch while a frame cradling the boat is slidable thereupon from one end to the other.

This invention relates generally to automobile trailers used specifically for carrying small boats thereupon. More specifically it relates to boom constructions of trailers.

A principal object of the present invention is to provide a trailer extension boom that will permit easier launching and retrieving of a boat, and wherein when the water is relatively shallow at the launch site, the trailer can be backed up a further distance out into the water, while the automobile remains upon solid, dry ground.

Another object is to provide a trailer extension boom that will eliminate the need to back up an automobile down a steep ramp, when launching a boat from the trailer or loading the same thereupon.

Yet another object is to provide a trailer extension boom that is longitudinally adjustable.

Yet another object is to provide a trailer adjustable extension boom that can be adjusted by a single person without requiring an extra person to help, nor any extra tools to make the adjustment.

Other objects are to provide a trailer adjustable extension boom that is simple in design, inexpensive to manufacture, rugged in construction, easy to use and efficient in operation.

These and other objects will be readily apparent upon a study of the following specification and the accompanying drawing wherein:

FIGURE 1 is a side elevation view of the invention shown in operative use,

FIGURE 2 is a detail view of a clamp that forms a part of the present invention, FIGURE 3 is a detail view of a swivel clamp that is adjustably secured upon the boom, FIGURE 4 is a side elevation view of the boom shown per se, and FIGURE 5 is a detail view of a swivel member secured to the end of the boom.

Referring now to the drawing in detail, the reference numeral 10 represents a trailer adjustable extension boom according to the present invention for supporting a boat 11 and which is secured at its front end to a hitch 12 of an automobile.

The trailer adjustable extension boom 10 includes a boom member 13 of elongated configuration, and being provided with a plurality of equally spaced apart openings or indentations 14 therealong for selectively engaging a double clamp 15 and a swivel clamp 16. The boom member 13 may be of generally square cross sectional configuration.

The double clamp 15 comprises a metal frame having a square opening 17 for receiving therein a frame 18 of the trailer 19, and a square opening 20 for receiving therein the boom 13. The portion of the frame that provides the square opening 17 is of generally U-shaped character having parallel legs 21 and cross arm 22. A bolt 23 secured by a nut 24 extends across the legs 21 and serves to clamp the legs against frame 18. The opening 20 is bounded by three rigid sides 25 and by the cross arm 22 integral therewith; one of the sides 25 having a threaded opening 26 for receiving a wing bolt 27 that bears against the boom, to secure the boom and trailer frame rigidly together.

The swivel clamp 16 comprises a metal frame having a square opening 28, one side of the frame having a threaded opening 29 to receive a wing bolt 30 that bears against the boom 13. The clamp 16 has an integral swivel ball 31 that is engaged by a socket 32 of a bracket 33 secured by a wing bolt 34 to the front end of the trailer frame 18.

A swivel member 35 is secured by a wing bolt 36 to the front end of the boom 13, the swivel member 35 having a socket 37 for engaging a ball 38 on the hitch 12.

In operative use the swivel clamp 16 is adjustably fitted on the boom, and double clamp 15 is secured to the rear end thereof. The bolts 27 and 30 are loosened. The U-clamp is put on the trailer frame. The socket 32 is engaged with ball 31 and the bolt 30 is tightened into one of the openings or indentations 14. To extend, just loosen bolt 30 and slide the frame 18 rearward relative to boom 13, and then tighten the bolt 30 in a selected opening 14.

While various changes may be made in the detail construction, it is understood that such changes will be within the spirit and scope of the present invention as is defined by the appended claims.

Having thus set forth and disclosed the nature of this invention, what is claimed is:

1. In a trailer adjustable extension boom, the combination of a boom member, a double clamp fixedly secured to a rear end of said boom member, a swivel clamp adjustably secured to an intermediate portion of said boom member, and a swivel member fixedly secured to a front end of said boom member, wherein said double clamp is also adapted to be adjustably secured to a frame of a boat trailer, said double clamp comprising a metal frame having a pair of square openings, one of said openings comprising a U-shaped portion on said metal frame, said U-shaped portion including parallel legs having a bolt connecting the ends thereof for clamping against said trailer frame, the other of said openings comprising a square portion of said metal frame having a wing bolt for bearing against said boom fitted therein.

2. The combination as set forth in claim 1 wherein said swivel clamp includes a metal frame having a square opening and a wing bolt for bearing against said boom.

3. The combination as set forth in claim 2 wherein said swivel clamp includes a ball for engagement in a socket of a bracket secured to a front end of said trailer frame.

4. The combination as set forth in claim 3 wherein said swivel member includes a socket for engagement with a ball on a hitch secured to an automobile.

References Cited

UNITED STATES PATENTS 2,844,389   7/1958   Burnett _____ 280—491 X
3,155,399   11/1964  Fetzko _____ 280—482

LEO FRIAGLIA, *Primary Examiner.*